April 4, 1967 J. J. ROCHLIS 3,312,583
APERTURED AND STAGGERED MOLDED PILE PRODUCT
Filed Oct. 2, 1963 5 Sheets-Sheet 1
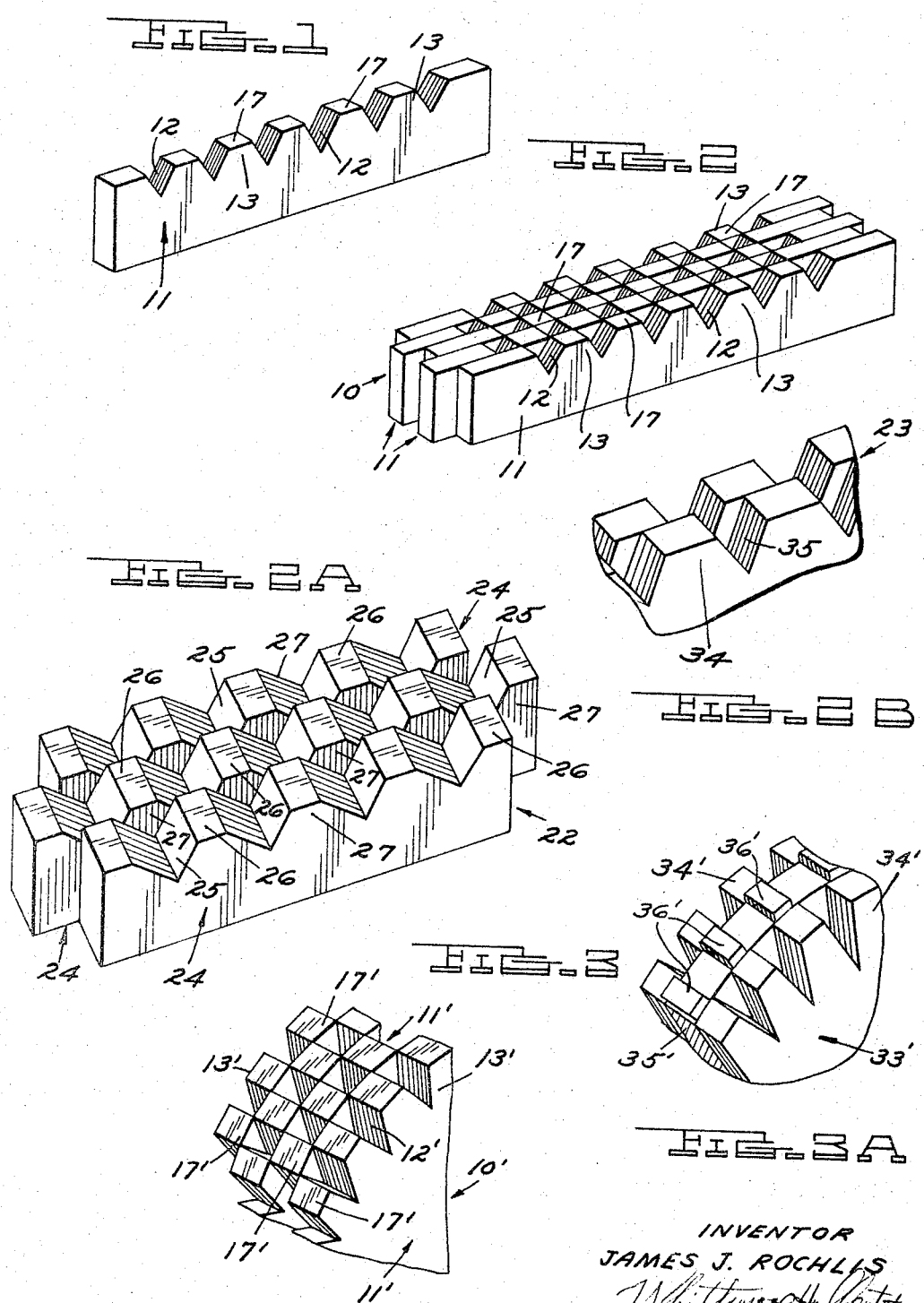
INVENTOR
JAMES J. ROCHLIS
BY
ATTORNEYS

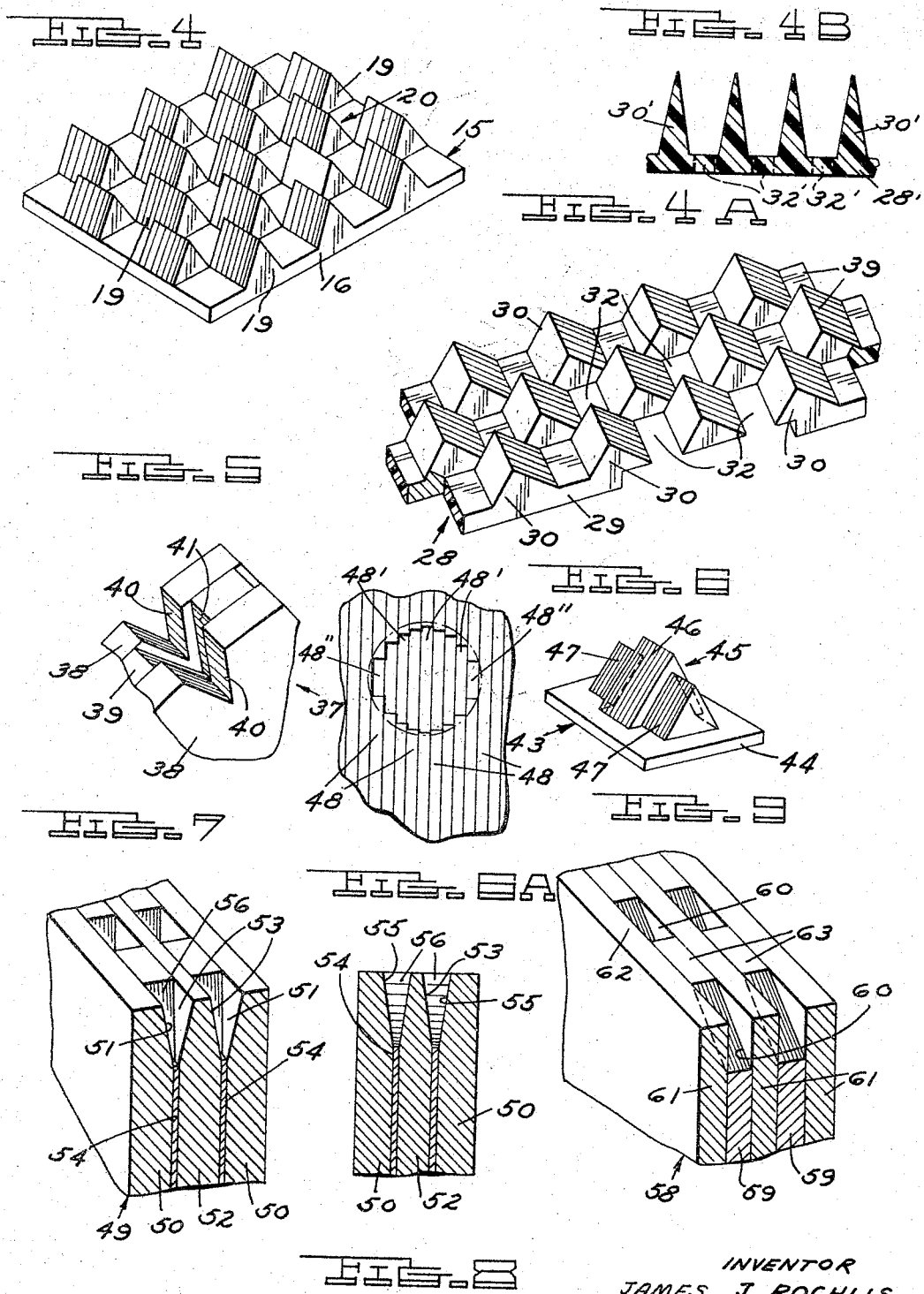

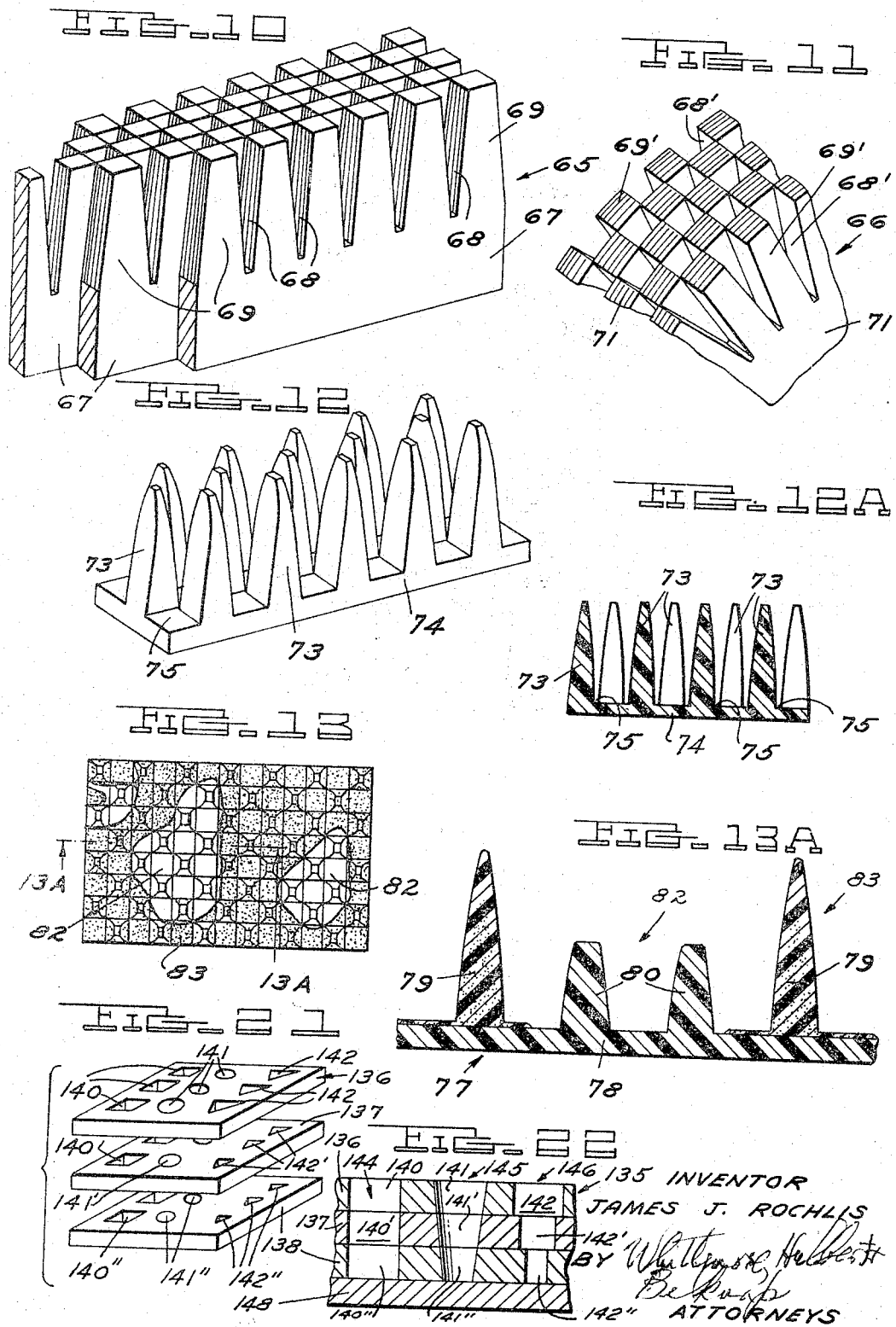

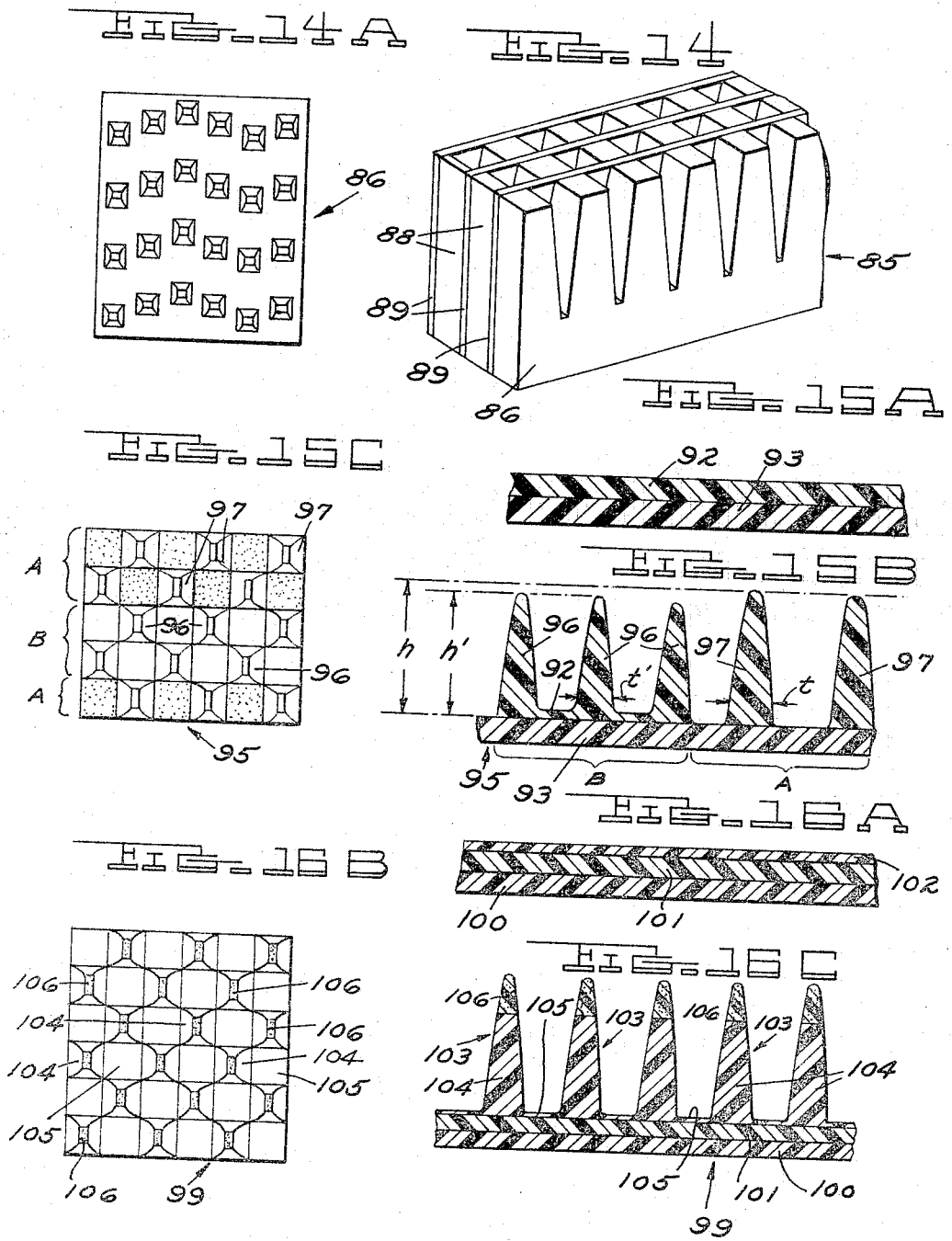

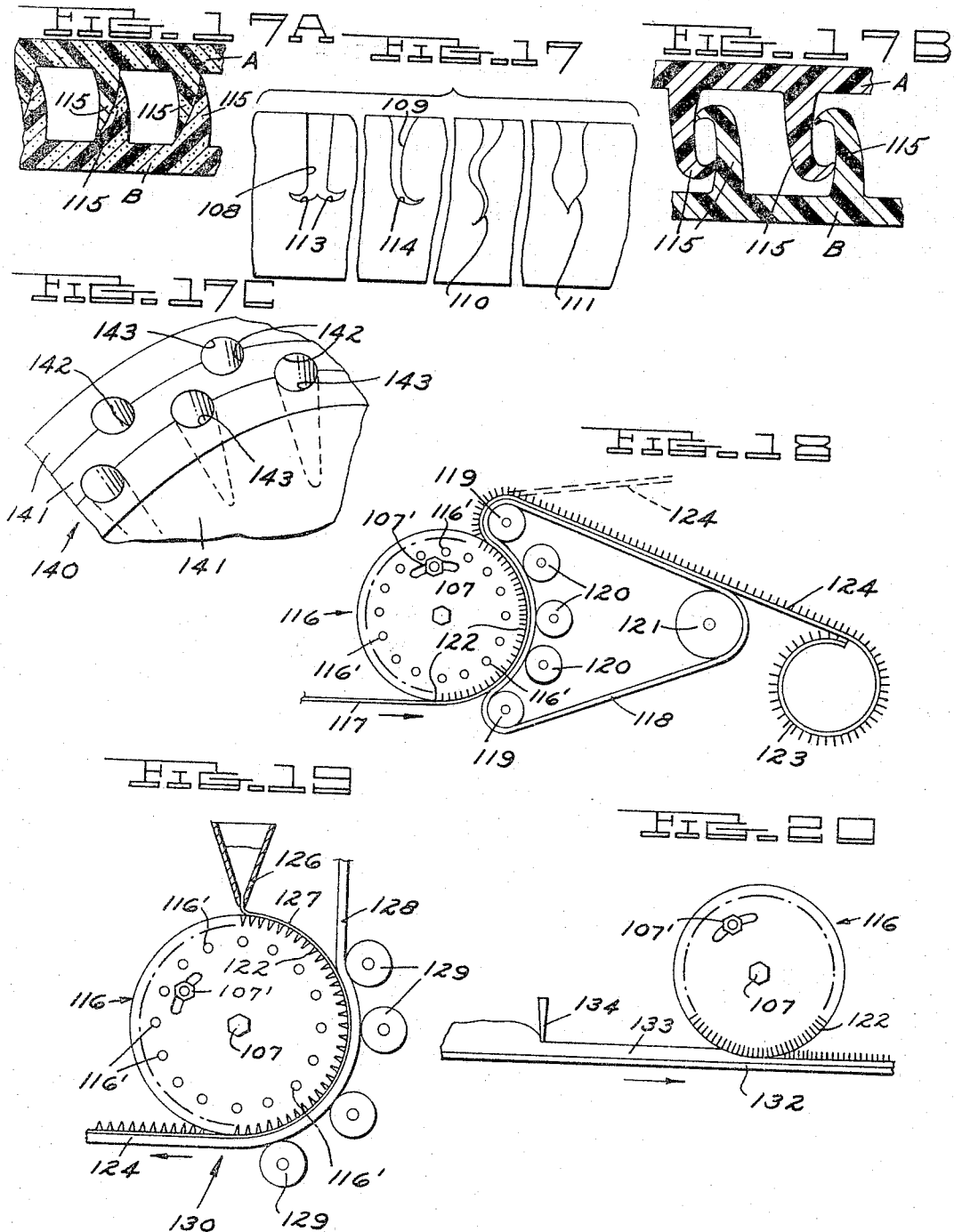

United States Patent Office 3,312,583
Patented Apr. 4, 1967

3,312,583
APERTURED AND STAGGERED MOLDED PILE PRODUCT
James J. Rochlis, 1862 Old Orchard Road, Abington, Pa. 19001
Filed Oct. 2, 1963, Ser. No. 313,356
1 Claim. (Cl. 161—62)

The present invention relates to improvements in pile-like material and a process and apparatus for making the same in a wide variety of specific physical embodiments for many different uses.

It is an object of the invention to provide an improved type of molded material or product of sheet-like or other contour in cross section, fabricated of a thermally or otherwise softenable and moldable substance having physical characteristics suitable for the intended use, such as a thermoplastic or thermosetting resinous compound, natural or synthetic rubber, a compound softenable by a special fugitive or other agent, and the like. All such products are characterized by an improved pile-like surface of one sort or another appropriate to the intended use. With this in mind, the expression "pile" as used herein is to be considered to apply to a group of projections protruding from a surface of the product, while "pile element" is used in referring to the individual projecting formations or members making up the pile.

The invention contemplates a great many different possible sizes, shapes and spacings of such elements relative to one another, making it possible to mold pile-like products having an almost infinite number of specifically different physical characteristics, and presenting many different visual, textural and other effects; yet they are produced in common by variants of the same basic method, employing the same basic forming equipment or apparatus.

For example, one general classification of molded pile article may exhibit relatively large and thick projecting components in one or another outline (for example, generally pyramidal) and spacing relative to one another. A sheet-like product of this character is suitable for use as an anti-slip matting, which may be provided with apertures therethrough in a predetermined relationship to the pile formations as a flexible, ground gripping shoe sole, as a shock absorbing layer, as a decorative wall surfacing sheet, as an upholstering material, etc.

In another specifically different but basically similar broad classification, the piling may be of a finer nap-like or filamentary character, such filaments or strands being integrally formed on a backing sheet or surface. Such material is well suited for many diverse uses. It may be employed as a brush bristle structure of a tooth brush or other massaging, coating, scraping or squeegee-like implement. It may possibly have an abrasive substance incorporated in the molded material to improve its quality for any of these purposes.

Pile-like sheets of this sort having relatively closely spaced, filament-like pile elements may have their like pile-like surfaces pressed together to cause a mechanical frictional interfit or intergrip of their respective pilings to hold the sheets together. Similarly, if the material of the piling be composed to include permanent magnetic particles as molded, its suitability for use in a magnetic "zipper" joint is apparent.

The finely pile-like material may be utilized as a heat insulation layer of an outer garment. A quite different application of the same type of pile-like material is in a mat or carpet which may have various visual and/or textural effects, varying cushion action, etc., as the result of different physical characteristics of the component pile elements. These may be, for example, in point of their length or height, their thickness, their spacing relative to one another or pile "population," their color, their hardness, and the like. The product may be employed as a sheet material for the making of gloves or in the molding of a complete glove, in which desired gripping and wear attributes may be had by a selective location of pile-like areas on the glove surface, by selectively treating the piles to improve wear-resistance, and the like.

Other more or less related industrial and construction adaptations of the principle of the invention are many and diversified, for example, as a sound and heat insulating structural sheeting, as a wound-up roll filter component, and so forth.

In any adaptation or embodiment of the pile-like product, particularly as a sheet, the invention contemplates the lamination of a layer, pile-like as above described, with an underlying or base layer of a porous or expanded foamy nature, the lamination being effected by heat and/or pressure in piling, thus to provide a sheet or like product having improved quality in respect to non-slippage friction, thermal or sound insulation, cushioning ability, and the like.

While it will be appreciated that only a relatively few examples typically suited for the above mentioned utilities are herein illustrated and described, they are nevertheless sufficient to indicate the wide versatility of the invention in its product aspect.

Another general object of the invention is to provide an improved method for the making of such pile-like products. This comprises the application of the material to provide the piling, for example a thermosoftenable, thermosettable or vulcanizable molding composition, preferably in a partially set but still flowable or moldable condition of a surface thereof (and, if desired, with softenable chips or crystals applied thereto) against a mold composed of a novel assembly of side-by-side arranged, marginally configured plates or laminae. The thus constituted mold may be a flat one or it may be of cylindrical or drum-like character, comprised of peripherally notched or shaped circular discs for continuous production. In either case, the plates or laminae are successively arranged in a selective manner with the notchings of one thereof in a desired relation to an adjacent lamina, or the notchings of the latter. Such selection is of course dictated by the nature of the desired molded pile effect.

In accordance with most of the embodiments herein shown, the notches in question are of a depth, regardless of the shape thereof, to extend only partially through the height or radius of the laminae plate or disc; and the notches extend wholly through the width of the relatively thin lamina. Thus, successive laminae may have their notched outer surfaces partially or wholly stepped or shifted relative to one another. The relationship in this respect determines the nature of the piling in regard to the design and population of the pile-like; in regard to a possible connection of pile elements to one another at the base thereof, or a distinct separation in this zone; in regard to a possible provision of apertures through the pile-like sheet product, etc. The shape of the notches determines the contour, height and width of the individual pile components. However, other types of assembled-laminae type mold than the through-notched type are contemplated for the production of pile formations of any desired configuration. Likewise, materials which are flowable and settable by means other than heat are contemplated.

In still further accordance with the invention, the pile formations may be of the same height throughout a given area of the product, or of different heights in that area, again as determined by the manner in which the lamina notching or other formation is selected or positioned. These and other characteristics of the product may also be determined in accordance with the relative color or hardness of component layers of the molded material, as such characteristics are reflected in the physical response of the material in becoming soft and/or setting. Thus, attractive visual, patterned, carved or half-tone effects may be had.

As in the case of the pile-like product, the basic method is capable of wide variation in detail, and only a few representative embodiments are illustrated herein.

Yet another object is to provide a piling method by which a pile-like layer or stratum may be laminated or built onto an underlying or base layer which is of relatively dense, homogeneous nature, or onto a relatively porous, expanded or foamed stratum or layer for the advantages mentioned above in regard to the product.

In any event the method contemplates the initial softening of a layer surface, thermally or otherwise, sufficiently to render the material readily flowable under mild pressure into the pile forming cavities of the mold, whereupon the material is caused to set up in the cavities to provide the pile elements of desired shape and character, then stripped from the mold. In these respects the present method differs markedly from present day high pressure extrusion and press practices requiring expensive and complicated equipment for commercial production.

While the cavities of the mold laminae will ordinarily be of simple V-shape or other symmetrical contour, the invention also contemplates variations in which the mold laminae formations for the cavities may be of special design or non-symmetrical outline. This enables the production of pile-like, filament-like napped surfaces having desired special characteristics of appearance, textural feel, cushioning quality, thermal or sound insulating quality, etc. It is also within the contemplation of the invention that a layer or lamination of layers may be pile-like on only one surface or on both opposite surfaces.

Another object of the invention is to provide improved equipment or apparatus for the high production and high efficiency practice of the method to produce the pile-like articles mentioned above.

A further object is to provide an improved method, and laminated disc equipment for practicing the same, in which the molding notches or cavities of most embodiments, extending as they do from side to side of the mold laminae (and in some cases through the thickness of the molded sheet), permit air or other evolved gas to escape during the molding or forming phase. It is therefore not trapped in the mold cavity in a manner to possibly alter the shape or size of the pile elements, which are therefore uniformly perfect throughout the pile area.

Moreover, the mold laminae may be produced very rapidly and inexpensively by a simple stamping operation.

Reference has been made both to the formation of molding cavities by notching a lamination of side-by-side mold plates in a direction inwardly of the edges of the laminae, i.e., in a direction paralleling the planes of their engaging surfaces. However, similar effects may be had by aperturing the plates within their edges and in a direction transverse of their meeting planes; and varying pile effects are possible by varying the character of the apertures. These may be formed by punching, drilling or other type of machining of the plates, by etching or by some other appropriate type of perforating of the stacked metal mold laminae, as will be described.

It is seen, however, that the method and apparatus differ more broadly in principle than in these respects from standard molding procedures and structures of known types, in that a relatively soft-surface material to be molded is forced, under relatively mild pressure, into molding cavities constituted by the laminae notches or other formations, the flowable material fully entering the mold cavities and being shaped thereby. This is usually attended by a heating or cooling of the mold to at least partially set the molded piles, whereupon the product is stripped from the mold. If desired, the pile-like product may also be simultaneously bonded to a backing member, or, as indicated above, it may be pile-like simultaneously on both of its sides.

The foregoing as well as other objects will become more apparent as this description proceeds, especially when considered in connection with the accompanying drawings illustrating preferred embodiments of the invention, wherein:

FIG. 1 is a perspective view of a single component mold lamina of a flat, plate-like notched character, which is adapted to be assembled with others of a similar type in the making of a mold for the purpose of the invention, in on embodiment of the latter;

FIG. 2 is a fragmentary perspective view showing such similar laminae assembled in one suggested side-by-side relation to form a flat mold having alternate, fully staggered pile forming notches;

FIG. 2A is a similar view illustrating another possible arrangement, by using which it is possible to make a pile-like product generally similar to that formed on the mold of FIG. 2, but further featuring a zig-zag base grid network, enabling the piles to hold together without further base structure, even though holes are formed through the grid network, if desired;

FIG. 2B is a fragmentary perspective view of still another alternative arrangement in modification of what is shown in FIG. 2;

FIG. 3 is a fragmentary perspective view of the basic invention depicted in FIG. 2, but as embodied in a cylindrical or drum-like mold for continuous production, and it is to be understood that flat mold arrangements such as those of FIGS. 2A and 2B are also contemplated to be of cylindrical mold outline;

FIG. 3A is a view similar to FIG. 3 of a portion of a mold which may be employed in making a pile-like sheet which is perforated or porous through an otherwise continuous base member;

FIG. 4 is a perspective view showing a portion of a molded pile product formed to a mold of the character of either FIG. 2 or 3;

FIG. 4A is a fragmentary perspective view of a pile-like product formed on a mold using the idea of FIG. 2A, FIG. 4A also showing how the base of the product may be made apertured if desired, with a grid-like arrangement integrally merging its pile elements with one another;

FIG. 4B is a fragmentary section through an apertured or porous sheet produced from the mold of FIG. 3A, the pile elements of which exhibit a separated, discrete character;

FIG. 5 is a fragmentary perspective view illustrating a further slight modification in the mold, which is in this case constructed of side-by-side mold laminae or discs having different outlines at the forming notches;

FIG. 6 is a fragmentary perspective view of a pyramidal-shaped pile element of a product formed on the mold structure of FIG. 5;

FIG. 6A is a plan or radial view in exaggerated scale of a portion of a mold following the general principle of that of FIG. 5, but enabling the production of pile elements which are of curved or circular cross-section, and either conical or cylindrical shape in elevation;

FIG. 7 is a fragmentary perspective view of a further alternative type of mold, featuring two-way tapered molding notch formations produced by assembled mold plates or discs of different character;

FIG. 8 is a view in vertical or radial cross section through the mold laminae of FIG. 7;

FIG. 9 is a fragmentary perspective view similar to FIG. 7, but showing a still further modified arrangement of mold-forming plates, alternate ones of which have plain outer peripheral edges;

FIG. 10 is a perspective view of a portion of a flat type of mold, generally similar in underlying principle to that of FIG. 2, but employed for the production of a pile-like product having a multiplicity of quite elongated and relatively closely spaced, pile-like pile elements or filaments;

FIG. 11 is a fragmentary perspective view showing a drum-type mold having molding formations like those of the flat mold of FIG. 10;

FIGS. 12 and 12A are, respectively, fragmentary views in perspective and in vertical section showing a portion of a product of the mold of either FIG. 10 or 11, featuring pile elements of relatively uniform height and uniform and longitudinal transverse spacings, respectively;

FIGS. 13 and 13A are, respectively, fragmentary top plan and vertical sectional views, the latter in greater scale, of a pile-like sheet produced by the use of a moldable base and moldable piling chips or materials which are of different color and/or hardness characteristics, with a resultant patterned and/or carved effect in the product;

FIG. 14 is a perspective view of a portion of a multiple laminated mold employing plain laminae alternating with notched laminae, being somewhat similar to the mold of FIG. 9;

FIG. 14A is a plan view of a portion of a sheet molded to a mold generally similar to that of FIG. 14, but with the forming laminae of the latter shifted relative to one another to produce staggered and more widely spaced pile elements on the product;

FIG. 15A is a fragmentary section through a pair of superposed plastic sheets used in producing a product with a distinctive half-tone-like appearance;

FIGS. 15B and 15C are, respectively, top plan and vertical sectional views, the latter in enlarged scale, of a pile-like sheet produced from the laminated sheet of FIG. 15A by an alternative method, i.e., using a mold in which various sections of the pile forming notches of the mold have different heights and/or spacings relative to one another, thus resulting in varying visual tones in the product;

FIG. 16A is a vertical section through a multiple laminated plastic sheet assembly used in the production of a still further visual effect;

FIGS. 16B and 16C are, respectively, top plan and vertical sectional views of a pile like article made from the laminated sheet of FIG. 16A, in which different shade or color effects are produced by pile elements of approximately equal length;

FIG. 17 is a fragmentary side elevational view of a mold lamina in which mold notches or formations of different contour may be selectively employed in the production of pile elements having molded outlines in a variety of shapes;

FIGS. 17A and 17B are fragmentary sectional views showing how pile outlines such as those of FIG. 17 may be employed for producing a mechanical pile interlock of sheets;

FIG. 17C is a fragmentary perspective view of a mold for the production of sheets or other articles having pile elements of various different section other than generally rectangular, such as circular, oval, and the like;

FIGS. 18, 19 and 20 are schematic side elevational views of alternative embodiments of molding apparatus which may be employed in forming pile-like products of the above described types, pursuant to the invention; and FIGS. 21 and 22 are, respectively, exploded perspective and sectional views showing a basic optional procedure in assembling mold lamina plates which are apertured otherwise than from edges thereof to provide mold cavities, FIG. 22 showing the apertured laminae arrangement in association with a cavity-closing base plate.

Referring to the drawings, FIGS. 1 and 2 illustrate the construction of a flat or planar type mold which may be used in the production of a sheet or like pile-like product such as is shown in FIG. 4. As in the case of all embodiments of the invention, this mold, generally designated 10, will be applied to and operated by molding equipment of the general sort illustrated in FIGS. 18, 19 and 20 of the drawings, to be hereinafter referred to.

The mold 10, of which a portion is shown in FIG. 2, is shown as being comprised of a plurality of like, side-by-side assembled plates or laminae 11, each of predetermined top-to-bottom height and formed to provide a plurality of molding notches 12 in equal longitudinally spaced relation to one another along the top edge thereof. These notches are separated from one another by upwardly truncated portions 13 of the respective laminae. The notches 12 are, in the illustrated forms appearing in the drawings, of like V-shaped contour, extending well into the body of the lamina a distance determined by the desired thickness and height of the pile elements, just as the width of such elements is determined by the thickness of the lamina across its upright sides.

Rather than being uniform in shape and spacing, the mold notches or recesses 12 may differ in these dimensional respects; and this holds true in regard to other illustrated embodiments of the mold lamina, except, of course, when the physical nature of the intended product forbids. Examples of such variants will be described.

Likewise, in any of the forms of the mold illustrated and described herein, the mold laminae may be fabricated of a suitably heat conductive metal, or of a non-metallic material capable of being formed in notched laminae, and to withstand thermal conditions arising in the molding procedure. Thus, in a thermo-softening, thermo-setting or vulcanizing operation, the mold may be called upon to withstand temperatures ranging from 190° F.–380° F., in which the moldable material, such as a known vinyl compound, may be in a flowable, semi-molten condition.

Referring to FIG. 4, the product of the mold construction of FIG. 2 (and also of the mold of FIG. 3) is seen to be a flat sheet, generally designated 15, characterized by a base layer 16 of a thickness determined by the thickness of the molded material left to overlie the flat top or crest areas 17 (FIGS. 1 and 2) of the laminae 11 intervening between their V-notches 12. From this layer 16 extend pile elements 19 (FIG. 4) which are of triangular or pyramidal cross sectional outline. In the embodiment under consideration, the pile elements or components 19 are of relatively thick nature, as distinguished from the more filamentary pile shapes hereinafter described. As thus composed, the pile or piling of the product, generally designated 20 in FIG. 4, is well suited for use as floor carpeting or anti-slip matting, as an improved, modified type of "ripple" shoe sole having the advantageous ability of flexing both transversely and longitudinally as well as obliquely in reference to these directions; or as a decorative, construction or industrial layer of any of the sorts mentioned above. In a suggested shoe sole or matting application it is to be noted that the total frictional or wear area presented by the piling is no less than that of known products having continuous, rather than staggered formations. Particularly in regard to a shoe sole use, the weight of the wearer is distributed in a very regular and uniform manner, with increased comfort to the wearer.

FIGS. 2A and 2B show portions of the mold structure, that of FIG. 2A being generally designated 22 and that of FIG. 2B being designated 23, which comprises an assembly of mold laminae 24, in structure only slightly different from the laminae of FIG. 2, but with the laminae shifted relatively in the direction of their length to cause a different staggered effect than that of the mold 10 of FIG. 2.

Thus, in FIG. 2A, the width of the notches 25, in the longitudinal direction of the lamina 24, is somewhat greater than that of the notches 12, with the result that the truncated crests or tops 26 of the pile formations 27 of one lamina 24 may be overlapped, at both sides, by the notches 25 of the succeeding lamina.

This enables the production of a sheet such as shown in part in FIG. 4A. If it be desired that this sheet, generally designated 28, be of an imperforate nature, the moldable material will be deposited upon the mold 22 in a thickness to substantially overlie the flat crests 26 of the pile elements 27. There thus results a sheet having a base 29 from which triangular or pyramidal pile formations 30 protrude; and these pile formations integrally join one another at their longitudinal overlaps to produce piling having a grid-like base characteristic at the thus-merged pile elements 30, i.e., a zig-zag outline.

On the other hand, if the molded material be forced, scraped or doctored off flush with the flat crests 26 of the mold 22, the product (as shown in FIG. 4A) will exhibit apertures or holes 32 through its base 29, the remainder of the sheet being connected at the piles. That is, the longitudinal dimension of the pile formations 30, in the direction of a given row, exceeds that of the apertures 32 of the next adjacent row, which apertures are overlapped at each end by the transversely aligned formations of the given row. Such a product may be advantageously used as a floor or bath mat having increased flexibility, as well as an ability to drain liquid, by reason of the apertures.

In FIG. 2B, the mold laminae may be similar to the laminae 24 of FIG. 2A, but with only a partial overlap of the portions 34 between notches 35. Here again, a connected grid-type base conformation is the result, but with the pattern of the pile elements somewhat different from what is depicted in FIG. 4A, in regard to the longitudinal and transverse staggering of the piles.

FIG. 3 of the drawings represents a mold constituted by circular, peripherally notched discs in a relative arrangement similar to that of the flat mold construction 10 of FIG. 2. Accordingly, because of this simple basic difference, the mold fragmentarily shown in FIG. 3 is designated 10' and all of its structural features, and relationships corresponding to those of FIG. 2 are designated by corresponding reference numerals, primed. Further description may thus be dispensed with, with the observation that the mold of FIG. 3 will produce a product like that of the article 15 of FIG. 4.

It is to be understood that alternative arrangements of the disc laminae 11' of FIG. 3, corresponding to those of FIGS. 2A and 2B may be adopted, for the production of articles similar to the sheet article 28 of FIG. 4A.

Should it be desired to produce an apertured or porous pile-like sheet, such as is shown in FIG. 4B, but characterized by a base 28' having perforations 32' therethrough alternating laterally and longitudinally with piles 30' which preserve their individual, discrete character (rather than being integrally merged at their bases as in FIG. 4A), a mold 33' like that of FIG. 3A will be employed. It has the usual sort of notched laminae 34' spaced from one another by discs or laminae 35' which have radial or outward projections 36' alternating with the notches of forming laminae 34'. These projections will penetrate the material of the base layer 28', as shown in FIG. 4B, leaving the perforations 32' in the latter, yet with the piles 30' wholly discrete and separate from one another, as in the product of FIG. 4.

FIG. 5 shows a portion of another mold element, generally designated 37, constituted by alternating disc laminae 38, 39 of different peripheral notching patterns. Thus, the discs 38 may be provided with V-notches 40 of a like given width and radial depth; while an intervening disc 39 features V-notches 41 of different (shown as greater) width and depth.

This mold will produce a pile-like product of which a portion, designated 43, is illustrated in FIG. 6. It has a base layer 44 of substantial thickness from which there integrally projects a composite triangular or pyramidal pile formation 45 having a central large component 46, integrally faced on either side by smaller formations 47 of stepped shape. It will be appreciated that the mold 37 of FIG. 5 may have its discs 38, 39 notched about the periphery thereof, so as to produce parallel rows of the pile formations 45, and that the sets of notches may be staggered relative to one another, as per FIGS. 2, 2A, 2B and 3, in accordance with the wish of the maker. In substantially all cases, the pile elements or formations 20, 30 or 45 will have linear alignment in the direction of the respective rows, and approximate transverse alignment in the general direction transverse of said rows, as determined by the scheme of staggering the respective molding formations of the mold laminae, whether they be flat or circular. However, the piles may also be at random.

FIG. 6A shows a variant of the type of mold of FIG. 5 for the production of pile elements which, rather than being of the stepped pyramidal shape, may be generally circular in cross section, and of a tapered conical or cylindrical contour in elevation. As before, such mold, whether flat or roll-like in character, is constituted by laminae 48 which are provided with edge notches 48' across the individual lamina thicknesses, the notches being of different widths in the direction in which the respective laminae extend. Thus the central notch 48' is of greatest width, and the notches of laminae progressing from opposite sides thereof are of progressively diminishing width. The series ends with notches 48" of minimum width which are spanned externally by unnotched laminae.

The result is to reduce a molding cavity which, though stepped in increments about its perimeter, approximates a true circle (such as is shown in dot-dash line in FIG. 6A); and it will be appreciated that other variations in the width of the notches relative to one another will result in mold cavities which, while they perhaps approach a bit less a perfect circle in cross section (for example, elliptical), are nevertheless substantially curved in perimetral outline.

By stamping plate or lamina edge notches 48' in a rectangular outline in the plane of the lamina there will result a molding cavity of substantially cylindrical or parallel-sided shape; while if the notches are, as in other embodiments, V-shaped, the resultant mold cavity will be substantially conical or tapering-sided. In any instance, the molded material tends to form in a rounded external outline, rather than in sharply defined increments of perimeter, so that the resulting molded pile elements may be considered as being truly curved surfaced in cross section.

FIGS. 7 and 8 illustrate alternative arrangements of mold or mold-constituting laminae of differing character, the mold being either a flat one, per FIG. 7, or cylindrical. Here, a section 49 of the mold is composed of a pair of like lamina plates or discs 50 which are radially inwardly beveled or tapered at a land 51 adjoining the outer edge or periphery thereof, and an intermediate plate or disc lamina 52 which is similarly tapered at 53 along both of its outer side surfaces.

Between the lamina 52 and the respective laminae 50 on either side thereof there are interposed a pair of like, relatively thin plates or discs 54, which are similarly tapered outwardly divergent at sides 55 adjacent the outer edge thereof; and the laminae or discs 54 are provided with inwardly convergent V-notches 56 at spaced intervals along or about the length thereof. As thus constituted, the mold segment 49 will produce linear rows or series of piles having a pronounced two-way outward taper from the base of a sheet otherwise similar to those appearing in FIGS. 4, 4A and 6.

FIG. 9 shows a fragment of a further, alternative type of mold segment 58 composed of a plurality of lamina plates 59 having V-notches 60 along or about the edges thereof, which laminae are alternately spaced by plain, unnotched plate laminae or discs 61, the outer edges 62 of the latter coming flush with the flat top lands or crests 63 of the notched plates. In the embodiments of FIGS. 7 and 8 and FIG. 9, the respective segments 49 may be arranged to alternately stagger notches as desired, and thus produce varyingly appearing and textured pile-like products.

FIGS. 10 and 11 of the drawings respectively illustrate alternative forms of laminated mold, respectively designated 65 and 66, in flat and cylindrical shapes; while FIGS. 12 and 12A show pile-like products molded to such mold structures.

In the embodiment of FIG. 10, the mold 65 is comprised of successively side-by-side plates 67 whose V-notches 68 are seen to be very deep as compared with the transverse and longitudinal widths of the notches. Such notches are spaced by upwardly truncated molding formations 69, likewise of relatively great height as compared with the rectangular cross sectional dimensions thereof. The staggered arrangement of the laminae 67 is seen to be the same as that of FIG. 2.

FIG. 11 simply shows a similar assembly 66 of laminae 71 which are of circular outline to constitute a cylindrical or drum-like mold. In other respects, the laminae 71 of FIG. 11 are like the laminae 67 of FIG. 10, so that corresponding structural features and relationships are designated by corresponding reference numerals, primed, and further description is dispensed with.

The product molded to either of the molds 65, 66 is, as shown in FIGS. 12 and 12A, characterized by pile formations 73 integrally extending from a sheet-like base 74, but of a relatively elongated, filamentary or bristle-like nature, as compared with those of the preceding embodiments. As in the case of the latter, the pile elements or formations 73 may be produced in a wide variety of staggered relationships to one another, at the choice of the user in his selection and relative disposition of the mold laminae 67 or 71.

Characteristically, and this applies also to the products of FIGS. 4, 4A, 6 and others similarly produced, a molded material, such as a vinyl plastic, tends to form in setting to a cross sectional outline other than precisely rectangular, or in a somewhat shrunken, rounded-corner cross sectional outline such as it is intended to depict in FIGS. 12 and 12A. Such natural shrinkage in setting will bring about the presence of longitudinal spaces at 75 (FIG. 12A) at the integral juncture of the pile elements 73 with the base 74, thereby having the effect of creating rows of longitudinally aligned pile elements, which rows are transversely spaced slightly from one another to afford distinct filamentary, bristle-like pile formations. As in all of the above product embodiments, the pile elements or formations converge outwardly from an integral joint with a base surface or member of substantial thickness. The formations of the parallel rows are at least partially staggered relative to one another in the longitudinal direction of those rows, with the result of producing approximate transverse alignments of pile elements of transversely non-successive rows. The horizontal cross section of each pile formation adjacent the base surface is approximately, though not exactly, rectangular; and in the illustrated embodiments the opposed parallel side elements of each section are disposed normal to the direction of the rows, the remaining opposed sides paralleling that direction.

The invention also contemplates various modifications in the pile-like product which are produced by varying the heights of the pile formations or elements, or their relative spacings from one another in the transverse or longitudinal senses; or by controlling the hardness or color of ingredients of the molded composition, and thereby varying the rate of heat absorption of the material and thus vary the height of the pile elements of the product as a whole in different areas thereof. In this manner, various eye-catching visual pattern effects, various textural and visual contrast effects, etc. may be produced. Thus, FIGS. 13 and 13A disclose a part of a sheet product 77 having a base 78 from which integrally extend pile formations 79, 80 of respectively different heights (see FIG. 13A), the effects being exaggerated somewhat for clarity. Such product is molded to a mold of the general type of FIG. 10 or 11, i.e., one in which the respective mold formations 69 or 69′ are uniformly shaped and dimensioned. It is possible to attain this differential height characteristic of the pile components 79, 80, hence the locally patterned or carved visual effect of FIG. 13 by using softenable and moldable chips of different hardness to constitute different portions of the area of the molded layer, so that the flowable material will set permanently in the mold at different times in the respective areas represented by the pile formations 79 and 80. The same effect may be attained using at the different contrasty areas, such as are designated 82 and 83 in FIG. 13, chips or other softenable material of different colors or shades. Thus, black chips applied to and forming the darker areas 83 will soften sooner and fill the mold cavities faster than white chips at the areas 82; and the result is a pile-like product which presents not only visual color or shade contrast, but also a carved effect due to the differential height factor of the pile elements 79, 80. A highly attractive floor matting may thus be produced, or a sheeting very well adapted to other utilizations calling for a distinctive appearance effect.

FIGS. 14 and 14A represent, respectively, a section of a composite mold 85 and a product 86 molded thereto. These simply illustrate the manner in which rows of longitudinally spaced pile elements may be not ony longitudinally staggered variably in the longitudinal sense, but also how the transverse spacing of the rows from one another may be controlled as desired.

Thus, the mold 85 is shown as composed of side-by-side assembled mold laminae 88 successively spaced from one another by plain edge strip laminae 89. A desired selection of the width of the spacers 89 enables the transverse spacing of pile rows to be controlled as desired. FIG. 14A is illustrative, and also shows how the mold cavities may be arranged, if desired, to form pile elements in a more or less random relation to one another, not necessarily in rows of transversely aligned formations as depicted in the mold of FIG. 14.

FIGS. 15A, 15B and 15C show a lamination of layers or plies 92, 93 for the molding of a pile-like sheet having different characteristics of shade contrast, much in the manner of the half-tone printing operation. In the production of such a contrasting tone product or sheet 95 (FIGS. 15B and 15C), an initial lamination of sheets 92, 93 is formed under pressure against a mold so constituted as to form a series of pile formations 96 of one height ($h$) and/or thickness ($t$) and a series of generally similar pile formations 97, but of a different height ($h'$) and/or thickness ($t'$), as well as spacing from one another, as shown in FIG. 15B.

Thus, the product 95 will exhibit zones, such as the zones "A" of FIG. 15C, which are of one degree of darkness or shade, and other zones "B" which are of a different or lighter shade. So, if it be assumed that the layer 92 of FIG. 15A is white and the layer 93 is red, the different proportioning and spacing of the mold cavities will result in a zone "A" containing pile elements 97 which is darker in shade and/or color than zones at "B." Desired striped visual characteristics may be attained due to this attribute, akin to a half-tone reproduction, by the use of different tuft heights and/or spacings.

FIGS. 16A, 16B, and 16C represent the production of still another modified embodiment, i.e., a sheet product 99 which may be considered to have been molded from a lamination (FIG. 16A) of different softenable sheets, for example, a bottom, relatively hard base sheet 100, perhaps red in color, a softer white sheet 101 in equal thickness laminated to sheet 100, and a third upper overlay sheet 102 of substantially less thickness and, for example, black. When pile-like, the pile projections 103 exhibit body portions 104 of black, merging at their bases with black areas 105, and capped at their tops by tips 106 of white, all pile elements 103 being of equal height.

While in the above described alternatives the component mold laminae are shown as being flush across the surfaces exposing the mold cavities, it is to be understood that they may be non-flush in this respect, with resultant different product characteristics. See FIG. 3A, for example.

Any suitable means, such as the driven shaft and retainer means 107 of FIGS. 18–20, may be employed to secure the mold laminae together in an optionally adjusted relationship. Conventional arcuate slot and bolt provisions 107' may be employed for the adjustment.

In the embodiments of the invention described above, the molds have been shown as edge-notched in a manner to produce pile elements of a simple symmetric shape, as a V-notch rectangular in cross section throughout its height. However, as illustrated in FIG. 17, the invention contemplates further modifications in this regard. Appearing therein are four suggested notch outlines, as viewed in a direction from the flat upright side surface of the mold plate or lamina. These notch outlines, respectively designated 108, 109, 110 and 111 may be generally symmetric, as the notch 108, but non-rectilinear sided and inwardly terminating in laterally outwardly flared curved portions 113; or they may be hooked at 114 (notch 109); or of sinuous contour in notch 110; or they may be of symmetric-sided, curved yet downwardly convergent character, as the notch 111. Pile-like materials produced from molds constituted by laminae of these sorts will exhibit distinctive differing textural features, and many other mold designs are of course available.

Of whatever character or shape they may be, the notches through the edges of the mold laminae, extending completely from side to side of the latter as they do, may be readily and inexpensively produced, as by die stamping the respective individual laminae and then assembling them together in the desired mold notch pattern.

Since the molded material is a flexible one of amorphous internal structure, and can yield for withdrawal of the pile formations, long or relatively short, from the notched mold cavities, any desired configuration of pile elements is possible, as evidenced by the special forms of mold lamina shown in FIG. 17.

FIGS. 17A and 17B suggest how the invention may be utilized to produce pile-like sheets which will interlock at the pile elements thereof when pressed together. This could serve the function of a "zipper" type fastening.

As depicted in FIG. 17A the pile elements 115 of the respective sheets A and B are shown as molded of a material having particles of magnetic material, such as alnico, incorporated therein, as indicated by stippling in FIG. 17A. This provides a very strong magnetic intergrip of the pile elements 115 when intermeshed as shown in that figure. In FIG. 17B the elements 115 are shown as hooked in form and in an interlocked relationship to afford a similar releasable connection of the sheets A and B to one another.

In the above described embodiments the pile members have been illustrated and described as being of a regular, substantially rectangular cross-sectional outline, whatever the nature of their shape may otherwise be. In most cases the pile elements have been characterized as being generally pyramidal or triangular; though a mold for a curved section element is shown in FIG. 6A. Forms of this kind are very practical, since it is possible, as indicated above, to produce the mold laminae fast, efficiently and cheaply by a die stamping and edge notching operation.

However, FIG. 17C shows an alternative type of mold 140, constituted by a side-by-side series of laminae or discs 141 each having a longitudinal series of recesses 142 extending inwardly thereof from an outer side edge. When registered with one another these recesses of successive laminae 141 form the molding cavities 143 extending radially inwardly from a disc edge, successive cavities being separated from one another by the material of the lamina. It will be appreciated that such cavities 143 may be of any desired shape, cylindrical, conical, of non-circular outline, rectangular outline, etc. Usually they will be of circular outline like the product of the mold of FIG. 6A.

FIGS. 18, 19 and 20 show various suggested procedures and apparatus for the forming of the moldable material against a mold constituted in accordance with the above illustrations. In each case the mold structure as a whole, generally designated 116, is a cylindrical or drum-like one for continuous quantity production, but might equally well be of a flat plate character for job production. The mold may be constituted by an assembly of edge-notched plate laminae, as described above, or by an assembly of flat or circular plates which are through-apertured from the sides thereof, as will be described.

In FIG. 18, the mold drum 116 may be constructed of appropriate metal or other material having necessary heat-resistant quality, in the event heat softening or setting is involved. A sheet or web layer 117 of the moldable material, for example, an elastomeric vinyl material or the like is trained and advanced around the cylinder or drum, as by means of an endless pressure belt 118 actuated around idler rollers 119 and pressure applying rollers 120, with belt tension maintained by an adjustable back-up roll 121. The pressure need be only sufficient, depending on the flowability of the molding material, to cause it to flow into and form in the mold cavities. The drum 116 has suitable elements or coils 116' for heating or cooling the same, if required; and the speed of rotation of the drum and travel of the material 117 is adjustable to permit at least a partial hardening of the material, as pile-like by pressing the same into the piling notches 122 of the drum, so that after leaving the latter, the pile elements will retain their molded shape. Some further curing or setting of the web or sheet may be necessary after it leaves drum 116; and it may do this in being formed into a roll at 123, or by being led off for severance into desired lengths, as indicated in dotted lines, the pile-like material being in each case designated by the reference numeral 124.

It is to be understood that in any of the embodiments of FIGS. 18, 19 and 20, the procedure contemplates the further lamination to the basic sheet or web 117 of necessary or desired backing material or sheets, per FIGS. 15A and 16A. It is also contemplated that any desired application of softenable chips may be applied to the web 117 as an incident to the piling operation.

FIG. 19 shows an arrangement in which a flowable material, as in the formation of a plastisol, is applied to the drum 116 through an elongated, hopper-like nozzle or slit 126, entering the notched mold cavities 122 of the component mold laminae and further providing material for formation of a backing sheet layer or stratum 127. The material is urged against mold drum 116 by a further web or sheet 128, which may be at the same time bonded to the layer 127. Desired pressure is applied by rollers 129, the bonded laminate issuing at 130 for further completion (if necessary) and disposal as desired. As in the embodiment of FIG. 18, pressure is applied approximately 180° about the drum 116 to insure the desired degree of setting of the piling.

FIG. 20 suggests the procedure of horizontally advancing a wholly or partially processed sheet 132 in the direction of the arrow to which a substantially thick coating or layer 133 of plastisol or like flowable and moldable material is applied, and controlled as to thickness by a doctor blade 134. This material is pile-like in the manner described above and bonded to the sheet 132 in passing the mold drum 116.

The invention further contemplates a procedure including the application of powdered crystalline or particulate material capable of being rendered flowable and moldable to the periphery of a heated mold drum 116. Such softened material is pressed into the mold notch cavities by any suitable means, such as the belt arrangement of FIG. 18, or a separately pressed web which may bond to the resin, emerging from the mold as a laminated component of the pile-like sheet. In all cases, it is contemplated that the product may be formed of a rubber compound, being set in desired condition by a vulcanizing procedure.

FIGS. 21 and 22 of the drawings illustrate an alternative procedure for assembling the mold, generally designated 135 in FIG. 22, which differs quite substantially from the previously described embodiments, in that the molding cavities are arranged to extend in a sidewise direction of the lamination of plates, rather than from an edge thereof. However, in the broadest sense of the molding procedure, the same principle is followed as in the earlier-described forms.

Thus, successive laminae 136, 137, 138 are provided, which may be either flat, per FIGS. 21 and 22, or arcuate so as to produce a cylindrical or drum-like mold. These laminae are apertured from side to side therethrough, rather than from an edge thereof. FIGS. 21 and 22 are schematic, in that they show the topmost plate 136 as provided with holes 140, 141 and 142 in spaced progression, these holes being respectively rectangular, circular and triangular in shape; while the next lamina 137 has similar holes 140', 141' and 142', respectively, in a similar transverse spacing; and the third lamina 138 in turn has like shaped apertures 140", 141" and 142" correspondingly spaced. FIG. 22 shows further variations in the respective plate apertures, as will be described.

While it is unlikely that the specifically different type of plate holes schematically shown in FIGS. 21 and 22 will be employed in any given mold, nevertheless, these views show the wide variation of molding cavity outlines which may be built into a laminated mold in which the cavity formations extend from side-to-side of the constitutent laminae rather than from edges thereof.

Thus, with the through-openings respectively aligned with one another in the fashion of FIG. 22, it is seen that the rectangular openings 140, 140', 140" may be of identical cross sectional area and shape. This results in a mold cavity 144 (FIG. 22) of uniform cylindrical cross section; and accordingly a pile element of corresponding uniform cross section throughout its length will result, the cross section being determined by the shape of the apertures, and, of course, not necessarily rectangular.

On the other hand, the openings may be of varying cross sectional area, though uniform in respect to their shape, circular or otherwise. Thus, the openings 141, 141' and 141" may be of frusto-conical shape and differing diameter, their outlines merging progressively with one another to provide a composite cavity 145 which is itself of elongated frusto-conical shape.

On the other hand, a stepped but generally pyramidal cavity 146 may be produced by shaping another set of plate apertures, 142, 142' and 142", in a similar shape but of progressively diminishing area, so that a pile element molded therein will have a generally pyramidal outline. Similarly, a generally conical pile element may be formed by making holes 142, 142' and 142" of curvilinear cross sectional outline.

In any form, the mold laminae 136, 137, 138 will be assembled to a base lamination 148 closing the ends of the cavities, as shown in FIG. 22.

Of whatever shape and size they may be, the plate cavity defining holes described above may be readily and economically formed in the laminae by punching, drilling or other known machine operation, by etching as in the production of printing plates, or by other known method of perforating. Pile elements formed in the cavities 144, 145 or 146 tend to attain a smoothly rounded peripheral surface, particularly in a stepped configuration such as the cavity 146. As in the other embodiments, air or gas evolved in the molding or hardening procedure may escape between mating surfaces of the laminations, thus preventing surface marring of the pile elements, be they of elongated filament like character or more blunt in outline. All other advantages described above are attainable in the use of a mold such as the mold 135 of FIG. 22.

From the above method and apparatus considerations, it is to be noted that the invention encompasses the production of various types of pile-like material, exhibiting either relatively wide and blunt piling formations, or relatively elongated, filamentary formations, by steps in no way resembling the injection or high pressure procedures, or any other technique now or heretofore employed. Thus, the method is capable of being practiced in continuous production utilizing continuously rotating mold forming equipment constituted of component mold laminations. Yet, under controlled conditions, for example of temperature and pressure, the equipment is capable of an industrial production at a continuous high output rate of pile-like stock corresponding to or exceeding that of any of the above illustrated and described forms. A rate of 40 linear feet per minute is possible.

An important aspect of the present invention, in regard to method and apparatus, resides in the fact that the assembly of a lamination of notched mold plates permits air or other gas to escape during the molding and setting operation. Thus, there is no possibility of such gas accumulation tending to mar the individual outlines of the pile elements or components, in any embodiment of the product. It follows that the latter is uniformly perfect in regard to the contour and size of its individual pile members, whatever such size and shape may be.

While the invention is not to be regarded as specifically limited in reference to dimensional size of the pile elements, nevertheless, for the sake of illustration, rather blunt pyramidal tuft formations, such as the formations 19, 30 and 45 of FIGS. 4, 4A and 6, may be considered as being of the order of, say, ¼ inch along the direction of the apex thereof, about the same dimension in the longitudinal direction of a row of formations, and in the neighborhood of ⅛ inch or less in height. Such a pile-like product will constitute an excellent multi-directionally flexible, anti-slip shoe sole, or other anti-friction cushion structure such as a floor mat.

On the other hand, in the much more finely pile-like products illustrated in FIGS. 12, 12A, 13, 13A, 14A, 15B, 15C, 16B and 16C, the base dimension of the slim, filament-like pile elements will be of the order of, say, less than 1/16 inch by about 1/32 inch, and of a height of about ⅛ inch. Such a product is adapted to a multitude of uses, for example, gloves, highly cushioned floor matting, bathing caps, and the like, in any of which adaptations the highly populated nature of the piling makes possible many attractive visual and textural effects, as by the procedures described in connection with FIGS. 13 and 13A, FIGS. 15B and 15C, and FIGS. 16B and 16C, and with or without aperturing of the base, as suggested in FIGS. 4A and 4B.

While the mold in various embodiments herein illustrated and described exhibits a series of plate-like laminae having the desired pile forming provisions, those skilled in the art will perceive the possibility of constructing a mold having similar capabilities by the use of a continuous strip wound helical-wise to bring successive laminae portions in side-by-side engagement with one another, such portions having mold formations formed therein either prior to or during the winding operation. Accordingly, unless more specifically claimed, the terms "lamina" and "laminae" are to be construed as applying to such a variation. The same is true of other variant procedural and/or structural modifications which will suggest themselves to those skilled in the art.

As appears from the foregoing, the invention is also not to be regarded as limited by the specific nature of material to be molded, which may be an amorphous one of any of a wide variety of types, of which only general categories have been mentioned above. This consideration is determined mainly by the particular characteristic or characteristics of the product which are desired to be attained. To enumerate specific examples of materials suitable to the multiple objectives herein mentioned would uselessly burden this application. Qualities of known molding materials appropriate to the purposes are familiar to those having ordinary skill in the art.

The drawings and the foregoing specification constitute a description of the improved pile-like material and process and apparatus for making same in such full, clear, concise and exact terms as to enable any person skilled in the art to practice the invention, the scope of which is indicated by the appended claim.

What I claim as my invention is:

A pile-like molded product, comprising a base having a plurality of parallel rows of pile formations of pyramidal shape integrally formed on and projecting from a surface thereof, the formations of the respective transversely successive rows being staggered relative to one another in the longitudinal direction of said rows, said base having apertures therethrough separating some of the pile formations of the respective rows from one another, the apertures of a given row being in transverse alignment with pile formations of an adjacent row and being overlapped longitudinally by the ends of such pile formations, the respective pile formations of said given and adjacent rows also longitudinally overlapping one another to provide an integral connection of said respective pile formations at the overlapped portions thereof.

References Cited by the Examiner

UNITED STATES PATENTS

| | | | |
|---|---|---|---|
| 2,245,047 | 6/1941 | Odell. | |
| 2,246,040 | 6/1941 | Guild | 161—66 |
| 2,306,732 | 12/1942 | Huxham | 18—44 |
| 2,315,721 | 4/1943 | Martin | 18—44 |
| 2,586,612 | 2/1952 | Caldwell | 4—187 |
| 2,816,853 | 12/1957 | Meyers | 161—63 |
| 2,971,245 | 2/1961 | Feild et al. | 161—62 |
| 3,027,595 | 4/1962 | Takai et al. | 264—284 |
| 3,055,357 | 9/1962 | Redka | 4—182 |
| 3,142,599 | 7/1964 | Chavannes. | |
| 3,152,002 | 10/1964 | Wisotsky et al. | |
| 3,179,550 | 3/1965 | Friedman | 161—62 |
| 3,180,782 | 4/1965 | Coates et al. | |

ALEXANDER WYMAN, *Primary Examiner.*

R. H. Criss, *Assistant Examiner.*